US011391589B2

(12) United States Patent
Duan et al.

(10) Patent No.: US 11,391,589 B2
(45) Date of Patent: Jul. 19, 2022

(54) SIGNPOST-BASED NAVIGATION METHOD, COMPUTER READABLE STORAGE MEDIUM AND ELECTRONIC DEVICE

(71) Applicant: BOE TECHNOLOGY GROUP CO., LTD., Beijing (CN)

(72) Inventors: Ran Duan, Beijing (CN); Lihua Geng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 591 days.

(21) Appl. No.: 16/408,597

(22) Filed: May 10, 2019

(65) Prior Publication Data
US 2020/0018614 A1    Jan. 16, 2020

(30) Foreign Application Priority Data

Jul. 10, 2018 (CN) .......................... 201810752514.0

(51) Int. Cl.
*G01C 21/36* (2006.01)
*G02B 27/01* (2006.01)
*G06V 20/58* (2022.01)

(52) U.S. Cl.
CPC ....... *G01C 21/3602* (2013.01); *G01C 21/365* (2013.01); *G02B 27/017* (2013.01); *G06V 20/582* (2022.01); *G06V 20/584* (2022.01); *G02B 2027/0178* (2013.01)

(58) Field of Classification Search
CPC .............. G01C 21/3602; G01C 21/365; G02B 27/017; G02B 2027/0178; G06K 9/00818; G06K 9/00825
See application file for complete search history.

(56) References Cited

U.S. PATENT DOCUMENTS

2009/0282369 A1    11/2009  Jones
2011/0043881 A1 *  2/2011   Elferich ................. G02C 7/101
                                              359/227
(Continued)

FOREIGN PATENT DOCUMENTS

CN    102016393 A    4/2011
CN    102970574 A    3/2013
CN    103716962 A    4/2014
(Continued)

OTHER PUBLICATIONS

First Office Action for Chinese Patent Application No. 201810752514.0 dated Mar. 20, 2020.

*Primary Examiner* — Kenneth J Malkowski
(74) *Attorney, Agent, or Firm* — Calfee, Halter & Griswold LLP

(57) ABSTRACT

A signpost-based navigation method, a computer readable storage medium, and an electronic device that implements the method. The method comprises: capturing a visible light signal emitted by a road sign, the visible light signal comprising multiple pieces of different signpost information; selecting, according to indication information corresponding to a current position of a vehicle on a navigation path, at least one piece of signpost information from the multiple pieces of different signpost information as signpost information of a current signpost; and controlling a shutter of shutter glasses so as to display the current signpost through the shutter glasses.

11 Claims, 3 Drawing Sheets

(56) References Cited

U.S. PATENT DOCUMENTS

2013/0345959 A1 12/2013 van Os et al.
2016/0153801 A1* 6/2016 Cho .......................... G06T 7/80
                                                         701/431

FOREIGN PATENT DOCUMENTS

CN          104335008 A      2/2015
CN          108225331 A      6/2018

* cited by examiner

SIGNPOST-BASED NAVIGATION METHOD, COMPUTER READABLE STORAGE MEDIUM AND ELECTRONIC DEVICE

RELATED APPLICATIONS

This application is the U.S. national phase entry of Chinese Patent Application No. 201810752514.0, filed on Jul. 10, 2018, the entire disclosure of which is incorporated herein by reference.

TECHNICAL FIELD

The present invention generally relates to the field of navigation technology, and more particularly to a signpost-based navigation system and method.

BACKGROUND

At present, signposts on roads mostly have fixed pattern styles. Different drivers have to identify their own useful signpost information for reference according to different needs.

SUMMARY

The present disclosure provides exemplary embodiments of signpost-based navigation methods. In an exemplary embodiment, the method comprises: capturing a visible light signal emitted by a road sign, the visible light signal comprising multiple pieces of different signpost information; selecting, according to indication information corresponding to a current position of a vehicle on a navigation path, at least one piece of signpost information from the multiple pieces of different signpost information as signpost information of a current signpost; and controlling a shutter of shutter glasses so as to display the current signpost through the shutter glasses.

In certain exemplary embodiments, the signpost information comprises frame rate information corresponding to frame rates for displaying respective signposts by the road sign. The controlling a shutter of shutter glasses comprises controlling the shutter of shutter glasses based on frame rate information corresponding to the current signpost.

In certain exemplary embodiments, before capturing a visible light signal emitted by a road sign, the method further comprises: generating the navigation path corresponding to the vehicle according to a starting position and an ending position; receiving position information of the vehicle sent by a positioning device in real time, the position information indicating the current position of the vehicle on the navigation path; and finding out a signpost on the navigation path that is in front of the vehicle and closest to the current position of the vehicle according to the current position and a pre-stored map, and generating indication information corresponding to the signpost.

In certain exemplary embodiments, the signpost information comprises at least one of direction information, lane information, speed limit information and distance information.

In another exemplary embodiment, the method comprises: capturing a visible light signal emitted by a road sign, the visible light signal comprising identification information of the road sign; finding out a signpost matching with the road sign on a navigation path corresponding to a vehicle according to the identification information of the road sign and a pre-stored map and using pre-set signpost information corresponding to the signpost as signpost information of a current signpost; and controlling a shutter of shutter glasses so as to display the current signpost through the shutter glasses.

In certain exemplary embodiments, the identification information of the road sign comprises at least one of numbering information and coordinates information.

In certain exemplary embodiments, signposts are marked on the pre-stored map and respectively have unique corresponding identification information.

In certain exemplary embodiments, before capturing a visible light signal emitted by a road sign, the method further comprises: generating the navigation path corresponding to the vehicle according to a starting position and an ending position; and finding out signposts on the navigation path on a pre-stored map and setting signpost information corresponding to respective signpost according to the navigation path.

In another exemplary embodiment, the system comprises: a capturing circuit configured to capture a visible light signal emitted by a road sign, the visible light signal comprising multiple pieces of different signpost information; a selecting circuit configured to select at least one piece of signpost information from the multiple pieces of different signpost information as signpost information of a current signpost according to indication information corresponding to the current position of a vehicle on a navigation path; and a control circuit configured to control a shutter of shutter glasses so as to display the current signpost through the shutter glasses.

In certain exemplary embodiments, the system further comprises: a path planning circuit configured to generate a navigation path corresponding to a vehicle according to a starting position and an ending position; a receiving circuit configured to receive position information sent by a positioning device in real time, the position information indicating the current position of the vehicle on the navigation path; and an indication information setting circuit configured to find out a signpost on the navigation path that is in front of the vehicle and closest to the current position of the vehicle according to the current position and a pre-stored map, and generate indication information corresponding to the signpost.

In certain exemplary embodiments, the signpost information comprises frame rate information corresponding to frame rates for displaying respective signposts by the road sign. The control circuit is configured to control opening of the shutter of shutter glasses based on frame rate information corresponding to the current signpost.

In another exemplary embodiment, the system comprises: a capturing circuit configured to capture a visible light signal emitted by a road sign, the visible light signal comprising identification information of the road sign; a matching circuit configured to find out a signpost matching with the road sign on a navigation path corresponding to a vehicle according to the identification information of the road sign and a pre-stored map, and use pre-set signpost information corresponding to the signpost as signpost information of a current signpost; and a control circuit configured to control a shutter of shutter glasses so as to display the current signpost through the shutter glasses.

In certain exemplary embodiments, the system further comprises a path planning circuit configured to generate the navigation path corresponding to the vehicle according to a starting position and an ending position; and a signpost information setting circuit configured to find out signposts on the navigation path on a pre-stored map and set signpost information corresponding to respective signposts according to the navigation path.

Another exemplary embodiment provides a computer readable storage medium having stored thereon computer instructions that, when executed by a processor, implement the steps of the method according to the embodiment of the present disclosure.

Another exemplary embodiment provides an electronic device comprising a memory, a processor and computer instructions stored on the memory and running in the processor, wherein the processor, when executing the computer instructions, implements the steps of the method according to the embodiment of the present disclosure.

BRIEF DESCRIPTION OF DRAWINGS

Other features, objects and advantages of the present disclosure may become more obvious by reading the detailed description of non-limiting, exemplary embodiments with reference to the following drawings.

DETAILED DESCRIPTION

The present disclosure will be further explained in detail in conjunction with the drawings and exemplary embodiments. It may be understood that the exemplary embodiments described herein are only configured to explain a relevant invention, rather than limit the invention. In addition, it shall also be explained that for the sake of depiction, the drawings only show the parts related to the invention.

It shall be noted that the exemplary embodiments of the present disclosure and features therein may be combined in any suitable manner. The present disclosure will be explained in detail with reference to the drawings and in conjunction with the exemplary embodiments.

In exemplary embodiments, there is provided on a road surface a road sign (e.g., an LED road sign) to indicate travelling information for vehicles. The road sign is correspondingly marked as a signpost on a pre-stored map. A vehicle driver may wear supporting shutter glasses that are configured for navigation to see correct signpost information. Therefore, exemplary embodiments provide a method which enables a driver to quickly identify useful information of a road sign for the sake of navigation. It would be appreciated that the signpost information may include navigation related information associated with a signpost.

The signpost-based navigation solution provided by exemplary embodiments achieves an association between a road sign and vehicle navigation on the basis of the technology of visible light communications. A light-emitting device, such as an LED lamp(s), on a road sign, may flicker at a certain frequency, for example, supposing the frequency is n Hz. When different routing options appear on the road sign, those options may be encoded into the light emitted by the LED lamp(s). Suppose there are m different options, the flicker frequency of the LED lamp(s) corresponding to the m options is n/m Hz.

Figure 1:
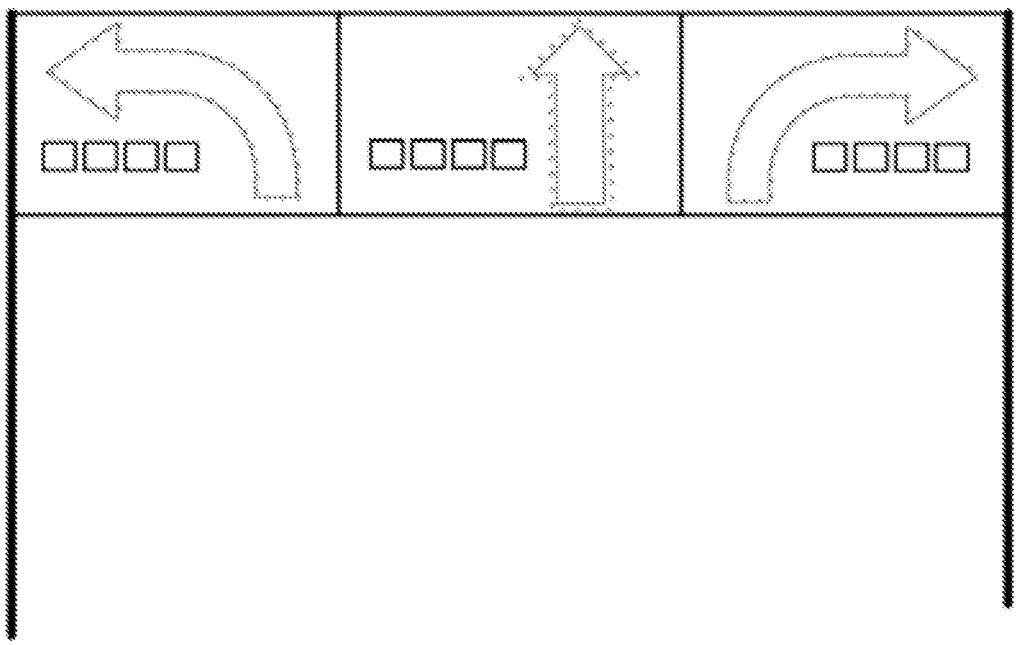
FIG. 1 is a structural schematic view of an LED road sign provided by exemplary embodiments.

FIG. 1 is a structural schematic view of an LED road sign provided by exemplary embodiments. FIG. 1 schematically shows three signpost options. A signpost may include graphics (e.g., arrows with different shapes) or text (e.g., speed limit 80 km). In some exemplary embodiments, the LED road sign may sequentially display different road signs included therein at corresponding frame rates. An LED lamp indicating a left turn may be turned on at the first, fourth, seventh, tenth, . . . n-th, (n+3)-th frame. An LED lamp indicating straight ahead may be turned on at the second, fifth, eighth, eleventh, . . . (n+1)-th, (n+4)-th frame. An LED lamp indicating a right turn may be turned on at the third, sixth, ninth, twelfth, . . . (n+2)-th, (n+5)-th frame.

The light signal emitted by an LED lamp corresponds to unique encoded information. For instance, the signpost information corresponding to three signpost options displayed by the LED road sign comprises: "left turn arrow", "straight ahead arrow, place name, XX meters", "right turn arrow", etc. The signpost information may be encoded according to a fixed rule, such as ASCII codes, digital lookup table codes or other coding form. Signpost information indicating different signposts, such as the encoded information of their navigation directions and corresponding frame rate information thereof, is transmitted by an LED visible light emitting device at an LED road sign end. As used herein, signpost information may include information indicated by a signpost and information related to display of the signpost by e.g., a road sign.

When a driver drives a vehicle to an area where a LED road sign is visible, the shutter of the shutter glasses is opened only for a specific frame(s) corresponding to the respective signpost information and closed for other frames. In such a way, the shutter glasses may enable the driver to see only navigation instructions that are consistent with his driving objective, and block irrelevant navigation prompt information, thereby making navigation simpler and clearer.

Figure 2:
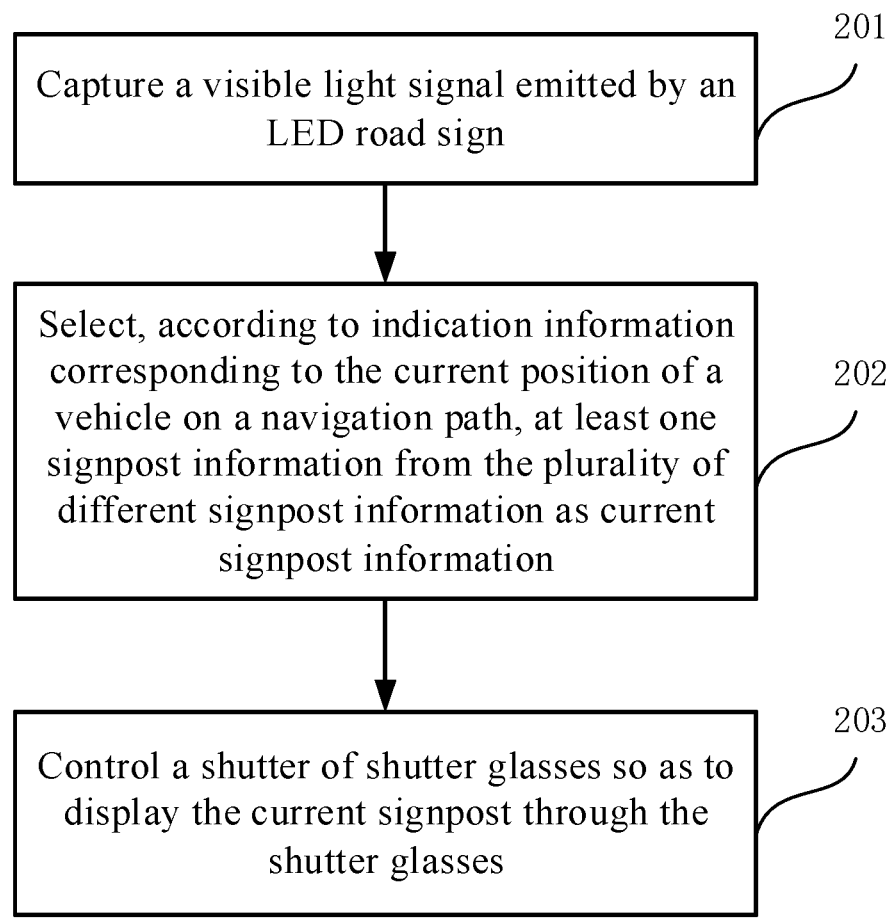
FIG. 2 is a flowchart schematic view of a signpost-based navigation method provided by exemplary embodiments.

FIG. 2 shows a flowchart schematic view of a signpost-based navigation method provided by exemplary embodiments.

In step 201, a visible light signal emitted by an LED road sign is captured. The visible light signal comprises multiple pieces of different signpost information.

In exemplary embodiments, the road sign is not limited to an LED road sign, but may be any suitable road sign capable of emitting a visible light signal and an encoded light signal. The signpost information comprised in the visible light signal that needs to be noticed on the corresponding route may be translated by decoding the visible light signal. Exemplarily, different information may be comprised by making the LED lamp flicker, such as ON for "1", and OFF for "0".

In some exemplary embodiments, the signpost information comprises at least one of direction information, lane information, speed limit information and distance information. This may provide a clear navigation guide for drivers.

In some exemplary embodiments, the signpost information comprises frame rate information used by the road sign to display respective signposts. The frame rate information may indicate the serial number of a frame in which an LED is turned on by the road sign for indicating a respective signpost.

In the step 202, according to indication information corresponding to a current position of a vehicle on a navigation path, at least one piece of signpost information is selected from the multiple pieces of different signpost information as current signpost information. The indication information may be various navigation information sent by an on-board navigation device or other navigation device, such as XXX meters from an intersection, right turn, and the like. In an example, when the navigation information is "right turn", it may be determined that "a right turn arrow" is used as the current signpost and the corresponding signpost information is selected.

In the step 203, a shutter of shutter glasses is controlled so as to display the current signpost to a driver of the vehicle through the shutter glasses. The control may be based on the selected signpost information.

In some exemplary embodiments, the shutter of shutter glasses may be controlled to be opened according to the frame rate information synchronously when the road sign displays the selected signpost, such that drivers wearing shutter glasses may see the signpost currently displayed by the road sign through the shutter glasses, that is, enabling to display the current signpost through the shutter glasses.

Figure 3:
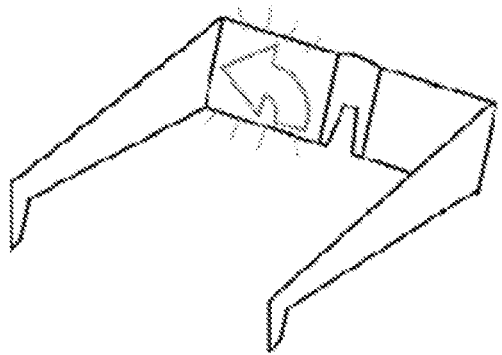
FIG. 3 is a schematic view showing the display of signpost information by shutter glasses provided by exemplary embodiments.

FIG. 3 shows a schematic view showing display of a signpost by shutter glasses provided by exemplary embodiments of the present disclosure. As shown in FIG. 3, when a driving objective (namely, a navigation path of a vehicle) of a driver indicates a left turn at the current position, the shutter glasses only allows presenting a "left turn arrow" signpost to the driver, thereby making the navigation instruction clearer and more definitive.

According to the method provided by exemplary embodiments, the plurality of signpost information comprised in visible light signal is matched with indication information corresponding to the current position so as to determine at least one piece of signpost information as the current signpost information for display through the shutter glasses. Since only the correct and useful signpost information is visible, while useless and confusing signpost information is directly blocked, the driver the driver is helped to simply drive the vehicle according to the correct signpost information.

In some exemplary embodiments, before capturing a visible light signal emitted by an LED road sign, the method may further comprise: generating the navigation path corresponding to the vehicle according to a starting position and an ending position; receiving position information of the vehicle sent by a positioning device in real time; and according to the current position of the vehicle on the navigation path and a pre-stored map, finding out a signpost on the navigation path that is in front of the vehicle and closest to the current position of the vehicle and generating indication information corresponding to the signpost.

After the navigation path is planned on the pre-stored map, the position of the vehicle on the navigation path may be determined in real time by receiving position data, such as latitude and longitude information, from a positioning system, such as the BeiDou/GPS/Galileo system. The signpost that is in front of the vehicle and closest to the current position of the vehicle may be found out on the navigation path on the basis of the position information of the vehicle. The indication information of the signpost, such as left turn, right turn or straight line, or 80 km/h, may be set according to the navigation path.

An application scenario is used as an example to further explain the signpost-based navigation method provided by exemplary embodiments. In the application scenario, suppose the starting position of the vehicle is point A and the planned ending position is point B, the navigation path of the vehicle may be determined according to the points A and B. There is a crossroads, point C, between the points A and B. An LED road sign indicator is located at the point C, and corresponds to a signpost on the pre-stored map, as shown in, e.g., FIG. 1. Exemplarily, the LED road sign indicator may be divided into three indicative areas from left to right in the horizontal direction. The first area indicates a left turn, and may comprise, e.g., a left turn arrow. The second area indicates straight ahead, and may comprise, e.g., a straight ahead arrow, a place name and a distance. The third area indicates a right turn, and may comprise, e.g., a right turn arrow. In addition, suppose the indication information set for the point C is a left turn for the determined navigation path of the vehicle. The indication information may be edited with ASCII codes, digital lookup table codes or other coding form.

When the vehicle drives closer to the point C, a vehicle receiving end receives the visible light signal emitted by the LED road sign at the point C. The visible light signal may be decoded/demodulated to obtain corresponding encoded information embedded into the visible light, namely, multiple pieces of signpost information. According to the indication information currently set for the point C, the information indicating left turn may be selected as the current signpost information from the plurality of signpost information so as to serve as the information to be displayed though the shutter glasses.

In some exemplary embodiments, the shutter glasses may be controlled to be opened for a frame in which "left turn" signpost information is conveyed by a corresponding LED road sign on the basis of the indication information set for the point C when the vehicle passes by the point C, thereby displaying information indicative of a left turn through the shutter glasses. Since only signpost information consistent with the navigation path is shown and useless signpost information is directly screened out, the navigation is faster and more convenient.

Figure 4:
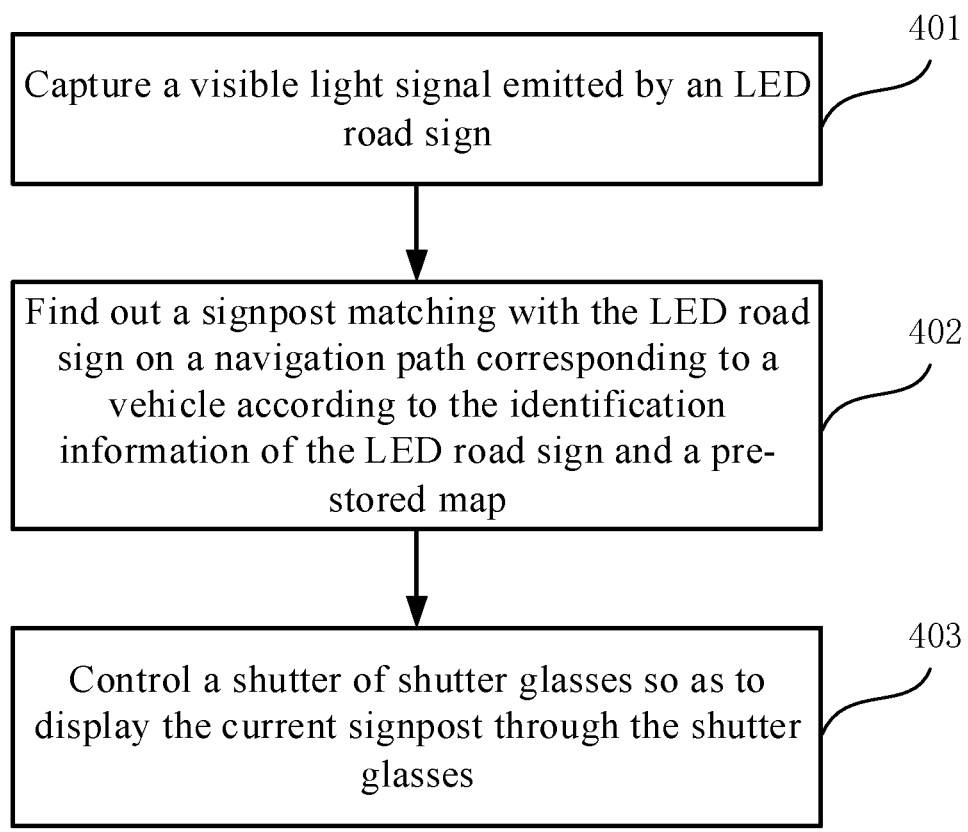
FIG. 4 is a flowchart schematic view of a signpost-based navigation method provided by another exemplary embodiment.

FIG. 4 shows a flowchart schematic view of a signpost-based navigation method provided by another exemplary embodiment.

In the step 401, a visible light signal emitted by an LED road sign is captured. The visible light signal comprises identification information of the LED road sign. The identification information of the LED road sign may comprise, e.g., numbering information and/or coordinates information thereof.

In the step 402, a signpost matching with the LED road sign is found out on a navigation path corresponding to a vehicle and a pre-stored map, based on the identification information of the LED road sign. Pre-set signpost information corresponding to the signpost is used as current signpost information.

In certain exemplary embodiments, the navigation path corresponding to the vehicle may be generated according to the starting position and the ending position of the vehicle.

In certain exemplary embodiments, a plurality of signposts on the navigation path may be searched on the pre-stored map, and signpost information corresponding to individual signposts may be set according to the navigation path.

In the step 403, a shutter of shutter glasses is controlled to enable the shutter glasses to display the current signpost. The control is performed based on the set signpost sign information.

In some exemplary embodiments, signposts marked on the pre-stored map respectively have unique corresponding identification information.

According to an exemplary embodiment, a signpost on the navigation path may be found according to the identification of the LED road sign so as to retrieve the pre-set signpost information corresponding to the signpost as the current signpost information to be displayed through the shutter glasses. Thus, the signpost information is provided in a faster and more convenient manner.

In certain exemplary embodiments, before capturing a visible light signal emitted by an LED road sign, the method further comprises: generating the navigation path corresponding to the vehicle according to a starting position and an ending position; and finding out signposts on the navigation path on a pre-stored map and setting signpost information corresponding to respective signposts according to the navigation path.

In the method according to an exemplary embodiment of the present disclosure, the signpost information corresponding to the signpost on the navigation path is set according to the navigation path, such that the corresponding signpost information may be more conveniently provided to for the shutter glasses when the matching signpost is found.

An application scenario is used as an example to further explain the signpost-based navigation method according to an exemplary embodiment. In the application scenario, suppose the identification information of a signpost on the pre-stored map is the serial number of the signpost, and the identification information of the LED road sign is the serial number of the road sign. Suppose the starting position is point A and the ending position is point B, the navigation path may be determined according to the points A and B.

Suppose the navigation path has six signposts between the points A and B. Thus, the six signposts on the navigation path and the serial numbers of the six signposts are found on the pre-stored map. These signposts have been pre-set on the pre-stored map, and the serial numbers thereof are not necessarily consecutive or in a certain order. The order of each signpost may be determined according to the navigation path. Exemplarily, the signpost information of each signpost may be pre-set according to the navigation path, for example, the six signposts from the point A to the point B are sequentially the signpost No. 3 (left turn)—the signpost No. 4 (left turn)—the signpost No. 7 (left turn)—the signpost No. 12 (right turn)—the signpost No. 10—the signpost No. 11 (straight line).

In an example, when the vehicle travels to the signpost No. 3 along the navigation path, it may receive the visible light signal emitted from the LED road sign. The visible light signal may be demodulated/decoded to obtain the encoded information embedded therein. The encoded information may comprise the serial number of the signpost matching with the LED road sign. The encoded information indicative of No. 3 and its corresponding frame rate information provided by the LED road sign are transmitted by the LED visible light emitting device. The visible light signal from the LED road sign is received and demodulated/decoded, for example, "3" is represented by ASCII codes as 0000 0011 in binary.

The serial number of the signpost that is consistent with No. 3 is found in the pre-stored map, and the signpost information corresponding to the signpost No. 3 is used as the information for displaying through the shutter glasses. The shutter of the shutter glasses is controlled to be opened when the LED road sign displays the signpost corresponding to the signpost No. 3, thereby a signpost corresponding to the signpost No. 3 is displayed to the driver. For instance, the driver may see clearly the correct signpost and remove the useless signpost by enabling the shutter glasses to display the signpost as shown in FIG. 3.

In the above navigation method, the LED road sign emits a flickering signal, and the visible light emitting device sends the encoded light information of the LED road sign in the form of visible light to a visible light signal receiving device on the vehicle. Communication in the form of visible light has the advantages of high density and low cost, and does not have electromagnetic radiation and interference problems as it does not rely on radio waves for transmission.

Operations for one or more exemplary embodiments are described above with reference to one or more logic flows. It may be appreciated that the representative logic flows do not necessarily have to be executed in the order presented, or in any particular order, unless otherwise indicated. Moreover, various activities described with respect to the logic flows may be executed in serial or parallel fashion. The logic flows may be implemented using one or more hardware elements and/or software elements or alternative elements as desired for a given set of design and performance constraints. For example, the logic flows may be implemented as logic (e.g., computer program instructions) for execution by a logic device (e.g., a general-purpose or specific-purpose computer).

Figure 5:
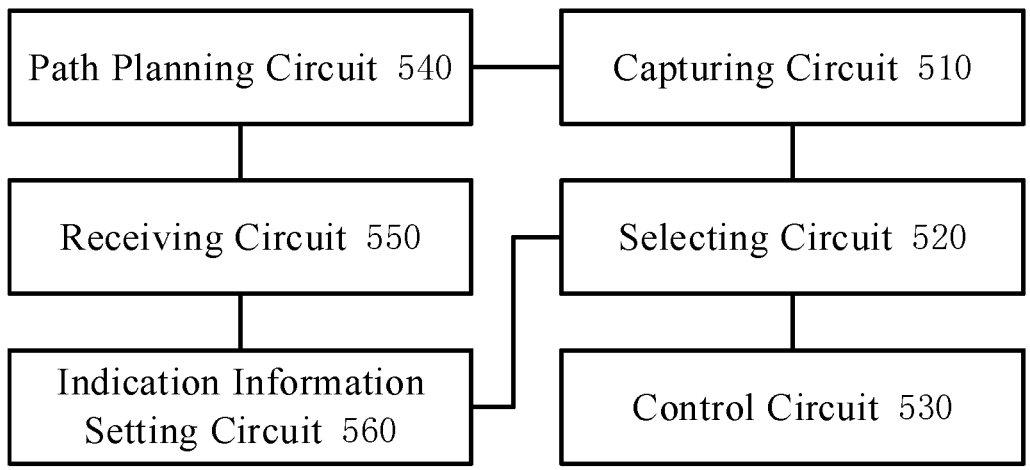
FIG. 5 is a structural schematic view of a signpost-based navigation system provided by exemplary embodiments.

FIG. 5 shows a signpost-based navigation system provided by exemplary embodiments. The system comprises a capturing circuit 510, a selecting circuit 520 and a control circuit 530.

The capturing circuit 510 may capture a visible light signal emitted by an LED road sign. The visible light signal may comprise multiple pieces of different signpost information.

The selecting circuit 520 may, according to indication information corresponding to the current position of a vehicle on a navigation path, select at least one piece of signpost information from the multiple pieces of different signpost information as current signpost information.

The control circuit 530 control a shutter of shutter glasses to enable the shutter glasses to display the current signpost.

Based on the technology of visible light communications, the capturing circuit may receive a visible light signal, and demodulate and/or decode the encoded information it contains into multiple pieces of different signpost information.

In certain exemplary embodiments, the system further comprises: a path planning circuit 540 configured to generate the navigation path corresponding to the vehicle according to a starting position and an ending position of the vehicle.

In certain exemplary embodiments, the system further comprises: a receiving circuit 550 configured to receive position information of the vehicle sent by a positioning device in real time. The positioning device may be a BeiDou/GPS/Galileo locator, from which the position information of the vehicle may be obtained. The receiving circuit 550 may be a wireless communicator, such as a Bluetooth or mobile network communication module, and is configured to wirelessly communicate with the positioning device to receive and derive the position information therefrom.

In certain exemplary embodiments, the system further comprises: an indication information setting circuit 560 configured to, according to the current position of the vehicle on the navigation path and a pre-stored map, find out a signpost on the navigation path that is in front of the vehicle and closest to the current position of the vehicle and generate indication information corresponding to the signpost.

Figure 6:
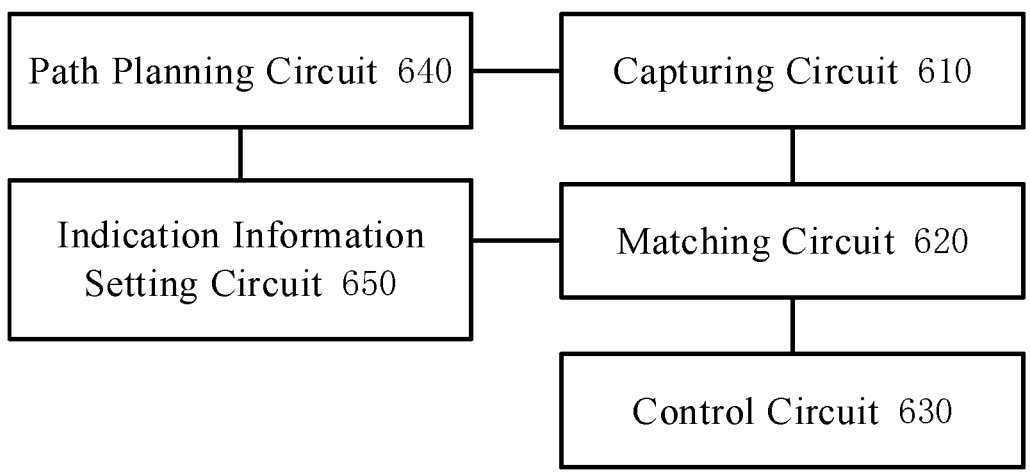
FIG. 6 is a structural schematic view of a signpost-based navigation system provided by another exemplary embodiment.

In the exemplary embodiment, the indication information for the nearest signpost in front of the vehicle is determined during the travelling of the vehicle, and by matching the received visible light signal of the LED road sign with the indication information for corresponding signpost, the correct signpost information may be found out from the visible light signal to serve as the current signpost information, such that the shutter glasses is opened at a corresponding moment to display the correct signpost information for navigation. FIG. 6 shows a signpost-based navigation system provided by another embodiment of the present disclosure. The system comprises a capturing circuit 610, a matching circuit 620 and a control circuit 630.

The capturing circuit 610 may capture a visible light signal emitted by an LED road sign. The visible light signal comprises identification information of the LED road sign.

The matching circuit 620 may, according to the identification information of the LED road sign and a pre-stored map, find out a signpost matching with the LED road sign on a navigation path corresponding to a vehicle and use pre-set signpost information corresponding to the signpost as current signpost information.

The control circuit 630 may control a shutter of shutter glasses so as to display the current signpost through the shutter glasses.

The signposts marked on the pre-stored map respectively have unique corresponding identification information. The identification information of the LED road sign comprises numbering information and/or coordinates information.

In certain exemplary embodiments, the system may further comprise a path planning circuit 640 configured to generate a navigation path corresponding to a vehicle according to a starting position and an ending position; and a signpost information setting circuit 650 configured to find out signposts on the navigation path on a pre-stored map and set signpost information corresponding to respective signposts according to the navigation path.

In the exemplary embodiment, after the pre-set signpost information of respective posts is pre-set on the navigation path and the LED road sign is matched with a signpost on the navigation path, it is fast and convenient to directly retrieve pre-set signpost information corresponding to the signpost as the current signpost information.

In exemplary embodiments, to facilitate understanding and depiction, the functional circuits corresponding to the functions to be performed are described. It is easy to understand that these functional circuits are functional entities and do not necessarily have to correspond to physically or logically independent entities. These functional entities may be implemented in the form of computer instructions executed by corresponding functional software run by a general-purpose processor, or programmably implemented in one or more hardware modules or integrated circuits, or implemented by being designed as integrated circuits specifically performing the corresponding functions.

For instance, the general-purpose processor may be, without limitation, a central processing unit (CPU), a microcontroller unit (MCU), a digital signal processor (DSP), etc.

For instance, a programmable integrated circuit may be, without limitation, a field-programmable gate array (FPGA).

For instance, a specific-purpose integrated circuit may be, without limitation, an application specific integrated circuit (ASIC).

For instance, a specific-purpose integrated circuit may be, without limitation, a circuit element formed of several basic electric devices, such as transistors, resistors, capacitors and inductors, according to a desired function.

In the exemplary embodiments, terms "system" and "circuit" may be implemented on one computer and/or on two or more computers.

The signpost-based navigation method and system provided by the exemplary embodiment may acquire useful signpost information timely and filter out unnecessary signpost information, thereby providing users with more accurate signpost information.

The exemplary embodiment also provides an electronic device for performing the above navigation method, comprising a memory, a processor and computer instructions stored on the memory and executable in the processor, wherein the processor when executing the computer instructions implements the steps of the method according to the exemplary embodiment.

The exemplary embodiment also provides a computer readable storage medium having computer instructions stored thereon, and the computer instructions when executed by the processor implement the steps of the method according to the exemplary embodiment.

Examples of an electronic device may comprise, without limitation, a mobile device, a personal digital assistant, a mobile computing device, a smart phone, a cellular telephone, a handset, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, or combination thereof.

The memory may be implemented in any type of volatile or non-volatile memory device or a combination thereof, such as, without limitation, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disk.

The processor may be a logical computing device with data processing capability and/or program execution capability, such as a central processing unit (CPU) or a field programmable logic array (FPGA) or a microcontroller unit (MCU) or a digital signal processor (DSP) or a programmable logic device (PLD) or an application specific integrated circuit (ASIC).

The computer instructions comprise one or more processor operations defined by an instruction set architecture corresponding to a processor. These computer instructions may be logically comprised and represented by one or more computer programs. The manner in which a computer program may be represented on an electronic device may comprise software components, programs, applications, application programs, system programs, machine programs, operating system software, middleware, firmware, software modules, routines, subroutines, functions, methods, procedures, software interfaces, application program interfaces (API), instruction sets, computing codes, computer codes, code segments, computer code segments, words, values, symbols, or any combination thereof.

Moreover, the term "exemplary" is used herein to mean serving as an example, instance, illustration, etc., and not necessarily as advantageous. As used herein, "or" is intended to mean an exclusive "or" rather than an inclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

The above description is only intended to explain a preferred embodiment of the present disclosure and the applied technological principles. It should be understood by those skilled in the art that the scope of the invention referred to in the present disclosure is not limited to the technical solution formed by the specific combination of the above technical features, and should also cover other technical solutions formed by any combination of the above technical features or the equivalent features thereof without departing from the inventive concept, such as the technical solutions formed by means of exchange between the above features and the technical features having similar functions that are disclosed in, but not limited to, the present disclosure.

The invention claimed is:

1. A signpost-based navigation method implemented by an electronic device, comprising:
    generating a navigation path corresponding to a vehicle according to a starting position and an ending position;
    receiving position information of the vehicle sent by a positioning device in real time, the position information indicating the current position of the vehicle on the navigation path;
    finding out a signpost in a pre-stored map corresponding to a road sign on the navigation path that is in front of the vehicle and closest to the current position of the vehicle according to the current position and the pre-stored map;
    generating indication information corresponding to the signpost;
    capturing a visible light signal emitted by the road sign, the road sign sequentially displaying different signposts included therein at corresponding frame rates and the generated indication information including multiple pieces of different signpost information indicating respective one of the signposts being encoded into the visible light signal;
    decoding the visible light signal to obtain the multiple pieces of different signpost information;
    selecting, according to indication information corresponding to the current position of the vehicle on the navigation path, at least one piece of signpost information from the multiple pieces of different signpost information as signpost information of a current signpost, wherein selected signpost information comprises selected frame rate information; and
    controlling a shutter of shutter glasses to be opened only for specific frames corresponding to the selected signpost information and closed for other frames based on the selected frame rate information so as to display the current signpost through the shutter glasses.

2. The method according to claim 1, wherein the road sign comprises an LED road sign,
    wherein the frame rate information determines the display of respective signposts by the road sign,
    the frame rate information indicating serial numbers of frames in which individual LEDs are turned on by the road sign for indicating respective signposts, and
    said controlling the shutter of shutter glasses comprises controlling the shutter of shutter glasses to be opened according to the frame rate information synchronously when the road sign displays the current signpost based on frame rate information corresponding to the current signpost.

3. The method according to claim 1, wherein the signpost information comprises at least one of direction information, lane information, speed limit information and distance information.

4. A computer readable storage medium having stored thereon computer instructions that, when executed, implement the steps of the method according to claim 1.

5. An electronic device comprising a memory, a processor and computer instructions stored on the memory and executable in the processor, wherein the processor, when executing the computer instruction implements the steps of the method according to claim 1.

6. A signpost-based navigation method, comprising:
    generating a navigation path corresponding to a vehicle according to a starting position and an ending position;
    receiving position information of the vehicle sent by a positioning device in real time, the position information indicating the current position of the vehicle on the navigation path;
    finding out a signpost in a pre-stored map matching with a road sign on the navigation path of the vehicle according to identification information of the road sign and the pre-stored map and using pre-set signpost information corresponding to the signpost as signpost information of a current signpost;
    capturing a visible light signal emitted by the road sign, the road sign sequentially displaying different signposts included therein at corresponding frame rates and the pre-set signpost information of the current signpost encoded into the visible light signal;
    decoding the visible light signal to obtain the pre-set signpost information of the current signpost, wherein the pre-set signpost information of the current signpost information comprises frame rate information;
    and
    controlling a shutter of shutter glasses to be opened only for a specific frame corresponding to the pre-set signpost information and closed for other frames based on the frame rate information so as to display the current signpost through the shutter glasses.

7. The method according to claim 6, wherein the identification information of the road sign comprises at least one of numbering information and coordinates information.

8. The method according to claim 6, wherein signposts are marked on the pre-stored map and respectively have unique corresponding identification information.

9. The method according to claim 6, wherein the road sign comprises an LED road sign,
    wherein the frame rate information determines the display of respective signposts by the road sign,
    the frame rate information indicating serial numbers of frames in which individual LEDs are turned on by the road sign for indicating respective signposts, and said controlling the shutter of shutter glasses comprises controlling opening of the shutter of shutter glasses to be opened according to the frame rate information synchronously when the road sign displays the current signpost based on frame rate information corresponding to the current signpost.

10. A computer readable storage medium having stored thereon computer instructions that, when executed, implement the steps of the method according to claim 6.

11. An electronic device comprising a memory, a processor and computer instructions stored on the memory and operating in the processor, wherein the processor when executing the computer instruction realizes the steps of the method according to claim 6.

* * * * *